(12) United States Patent
Houck

(10) Patent No.: US 12,519,669 B2
(45) Date of Patent: Jan. 6, 2026

(54) POWER OVER CABLE FILTERS FOR SERIAL COMMUNICATION LINKS

(71) Applicant: Maxim Integrated Products, Inc., San Jose, CA (US)

(72) Inventor: Thomas J. Houck, South Lyon, MI (US)

(73) Assignee: Maxim Integrated Products, Inc., San Jose, CA (US)

( * ) Notice: Subject to any disclaimer, the term of this patent is extended or adjusted under 35 U.S.C. 154(b) by 1 day.

(21) Appl. No.: 18/598,340

(22) Filed: Mar. 7, 2024

(65) Prior Publication Data

US 2024/0313988 A1 Sep. 19, 2024

Related U.S. Application Data

(60) Provisional application No. 63/490,166, filed on Mar. 14, 2023.

(51) Int. Cl.
*H04L 12/10* (2006.01)
*H04B 3/54* (2006.01)

(52) U.S. Cl.
CPC ............... *H04L 12/10* (2013.01); *H04B 3/54* (2013.01)

(58) Field of Classification Search
CPC .................................. H04L 12/10; H04B 3/54
See application file for complete search history.

(56) References Cited

U.S. PATENT DOCUMENTS

| | | | |
|---|---|---|---|
| 9,417,944 B2 | 8/2016 | Kessler | |
| 10,852,799 B2 | 12/2020 | Patterson et al. | |
| 11,916,374 B2 * | 2/2024 | Potterf | ...................... G06F 1/26 |
| 2017/0174131 A1 * | 6/2017 | Sigle | ...................... H04N 7/181 |

FOREIGN PATENT DOCUMENTS

| CN | 118659756 A | 9/2024 |
|---|---|---|
| DE | 10 2024 107 107 A1 | 9/2024 |

* cited by examiner

*Primary Examiner* — David S Huang
(74) *Attorney, Agent, or Firm* — ArentFox Schiff LLP

(57) ABSTRACT

A serial communication link includes a waveguide having a first end and a second end, a serializer communicatively coupled to the first end of the waveguide, a deserializer communicatively coupled to the second end of the waveguide, a first power over cable (PoC) filter, and a second PoC filter. The first PoC filter is electrically coupled between to first end of the waveguide, and the first PoC filter includes two inductors that are configured to collectively present an impedance of at least one thousand ohms over an entire operating frequency range of the serial communication link. The second PoC filter is electrically coupled to the second end of the waveguide, and the second PoC filter includes two inductors that are configured to collectively present an impedance of at least one thousand ohms over the entire operating frequency range of the serial communication link.

20 Claims, 9 Drawing Sheets

POWER OVER CABLE FILTERS FOR SERIAL COMMUNICATION LINKS

RELATED APPLICATIONS

This application claims benefit of U.S. Provisional Patent Application No. 63/490,166, filed on Mar. 14, 2023, which is incorporated herein by reference.

BACKGROUND

Vehicles are increasingly including advanced driver assistance systems (ADASs). An ADAS may be used, for example, to assist a driver of a vehicle by identifying an object in the vehicle's path, warning the driver of a lane departure, performing emergency braking, identifying a traffic sign, etc. An ADAS may also be used to support automated vehicle driving. An ADAS typically includes one or more sensors, such as a camera, a radio detection and ranging (RADAR) device, and/or a light detection and ranging (LiDAR) device, that are communicatively coupled to a processor via a serial communication link.

DETAILED DESCRIPTION OF THE EMBODIMENTS

Disclosed herein are power over cable (PoC) filters for serial communication links, which significantly advance the state of the art. The new PoC filters are used, for example, to help block transmission of undesired alternating current (AC) signals to a waveguide of a serial communication link. Certain embodiments of the PoC filters include two inductors which collectively present a sufficiently high impedance, e.g., an impedance of at least one thousand ohms, to enable proper serial communication link operation over an entire operating frequency range of the serial communication link, e.g., over a frequency range extending from at least 10 megahertz to 3 gigahertz. Such ability to present a sufficiently high impedance using only two inductors per PoC filter advantageously promotes small size and low cost of the PoC filters, which cannot be achieved using conventional technology. Possible applications of the new POC filters include, but are not limited to, distributed systems in automotive applications, such as in advanced driver assistance systems (ADASs) in automobiles, where the POC filters may be particularly advantageous due to their relatively small size and low cost.

Figure 1:
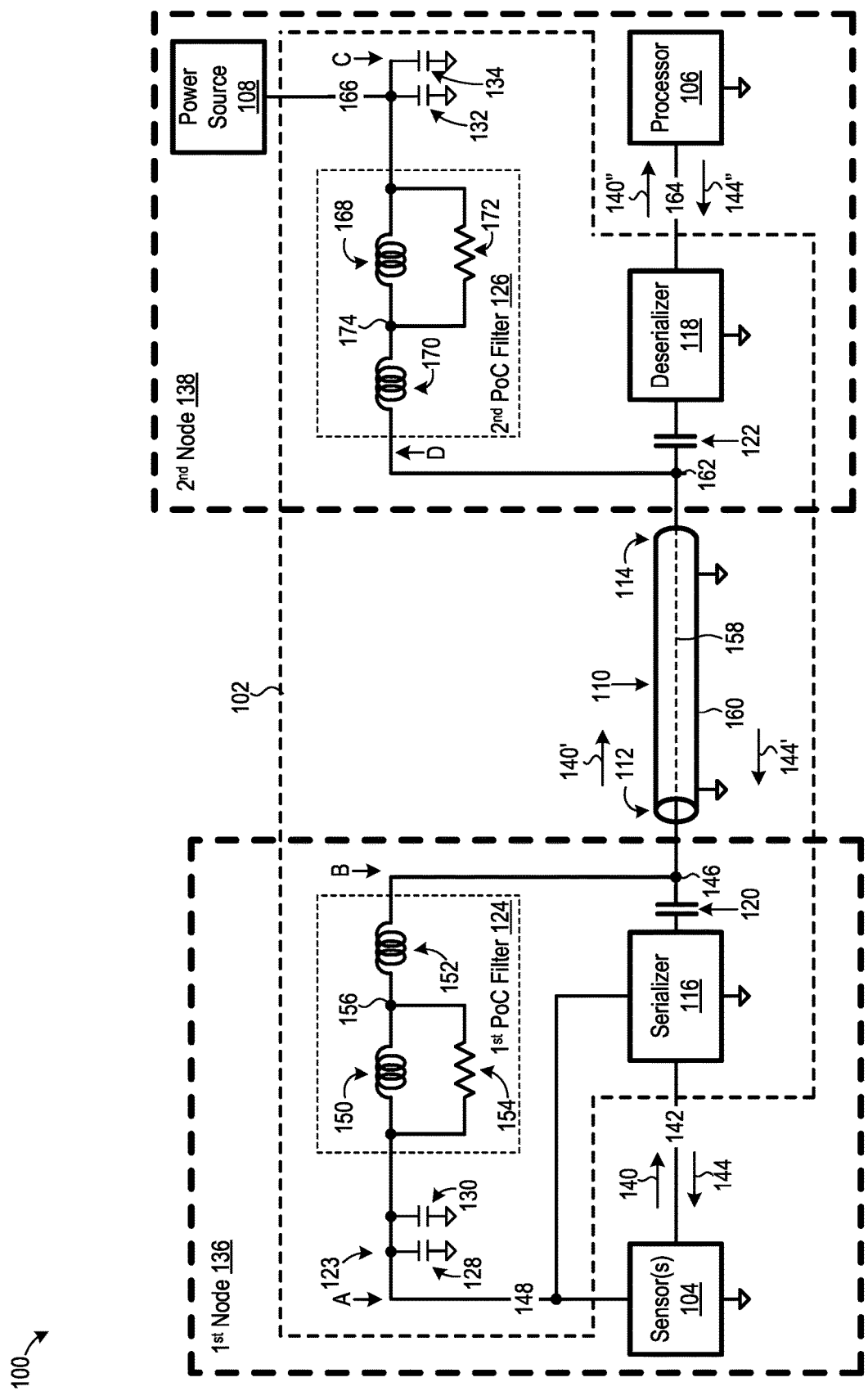
FIG. 1 is a schematic diagram of a distributed system including a serial communication link with two power of cable (PoC) filters, according to an embodiment.

FIG. 1 is a schematic diagram of a distributed system 100 including two instances of the new PoC filters disclosed herein. Distributed system 100 includes a serial communication link 102, one or more sensors 104, a processor 106, and an electrical power source 108. Serial communication link 102 includes a waveguide 110 having a first end 112 and a second end 114, a serializer 116, a deserializer 118, a first capacitor 120, a second capacitor 122, power circuitry 123, a first PoC filter 124, a second PoC filter 126, an optional first decoupling capacitor 128, an optional second decoupling capacitor 130, an optional third decoupling capacitor 132, and an optional fourth decoupling capacitor 134. Each of first PoC filter 124 and second POC filter 126 is an embodiment of the new PoC filters disclosed herein. Serial communication link 102 may referred to as a "SERDES" serial communication link due to presence of serializer 116 and deserializer 118. Each of one or more sensors 104, serializer 116, first capacitor 120, first PoC filter 124, first decoupling capacitor 128 and second decoupling capacitor 130 is located at a first node 136 of distributed system 100. Each of processor 106, deserializer 118, second capacitor 122, second PoC filter 126, third decoupling capacitor 132, and fourth decoupling capacitor 134 is located at a second node 138 of distributed system 100.

Waveguide 110 couples first node 136 and second node 138. As discussed below, serial communication link 102 transmits signals between first node 136 of distributed system 100 and second node 138 of distributed system 100 via waveguide 110. Serial communication link 102 also transmits electrical power from second node 138 to first node 136 via waveguide 110.

Figure 2:
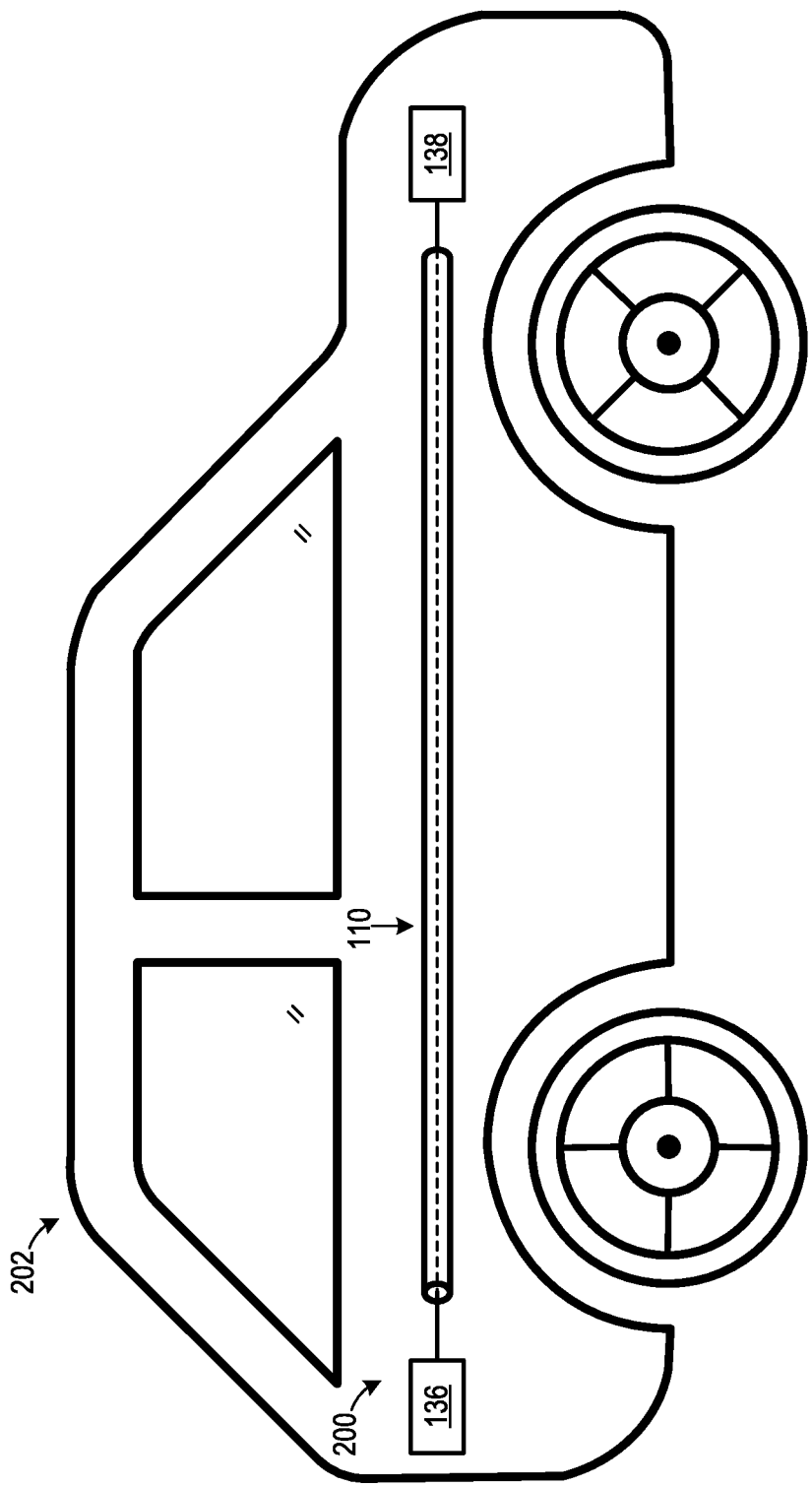
FIG. 2 illustrates an embodiment of the FIG. 1 distributed system configured as an advanced driver assistance systems (ADAS), according to an embodiment.

Distributed system 100 can be used, for example, in essentially any application where it is desired to serially transmit data and electrical power between two or more nodes. One possible application of distributed system 100 is in an ADAS application. For example, FIG. 2 illustrates an ADAS 200 in an automobile 202, where ADAS 200 is an embodiment of distributed system 100 configured as an ADAS. First node 136 is located in the rear of automobile 202, and first node 136 includes, for example, one or more sensors 104 (not shown in FIG. 2) configured for generating signals for ADAS use. Second node 138 is located in the front of automobile 202, and second node 138 includes, for example, processor 106 (not shown in FIG. 2) configured to process signals from one or more sensors 104 for ADAS purposes. Waveguide 110 extends from the rear of automobile 202 to the front of automobile 202 to couple first node 136 and second node 138.

Referring again to FIG. 1, one or more sensors 104 include, for example, a camera, a radio detection and ranging (RADAR) device, and/or a light detection and ranging (LiDAR) device, such as discussed below with respect to FIG. 4. However one or more sensors 104 could include other types of sensors, such as in embodiments of distributed system 100 used in applications other than ADAS. One or more sensors 104 collectively generate sensor signals 140 for distributed system 100. For example, in embodiments where one or more sensors 104 include a camera (not shown), sensor signals 140 include signals generated by the camera, such as signals representing an image captured by the camera. As another example, in embodiments where one or more sensors 104 include a RADAR device (not shown), sensor signals 140 include signals generating by the RADAR device, such as signals representing objects detected by the RADAR device. As yet another example, in embodiments where one or more sensors 104 include a LiDAR device (not shown), sensor signals 140 include signals generating by the LiDAR device, such as signals representing objects detected by the LiDAR device. As an additional example, in embodiments where one or more sensors 104 include a camera (not shown) and a RADAR device (not shown), sensor signals 140 include (a) signals generating by the camera and (b) signals generated by the RADAR device. Sensor signals 140 are in parallel form, for example, when generated by one or more sensors 104.

A first communication bus 142 is configured to communicatively couple sensor signals 140 to serializer 116, and first communication bus 142 is optionally also configured to communicatively coupled control signals 144 from serializer 116 to one or more sensors 104. Control signals 144 are used, for example, to control one or more sensors 104. Serializer 116 is configured to communicatively interface one or more sensors 104 with first end 112 of waveguide 110. In some embodiments, serializer 116 is configured to convert sensor signals 140 from parallel form to serial form, to generate sensor signals 140' for transmission from first node 136 to second node 138 via waveguide 110. In certain embodiments, serializer 116 is also configured to convert control signals 144', which are received from second node 138 via waveguide 110, from serial form to parallel form to generate control signals 144. Serializer 116 is optionally further configured to received additional control signals (not shown) from waveguide 110 for controlling the serializer. Serializer 116 could be configured to communicatively interface one or more sensors 104 with waveguide 110 in other manners without departing from the scope hereof.

Serializer 116 is communicatively coupled to first end 112 of waveguide 110 at a point 146, via first capacitor 120. First capacitor 120 enables transmission of AC signals between serializer 116 and waveguide 110, but first capacitor 120 blocks transmission of direct current (DC) signals between waveguide 110 and serializer 116. While first capacitor 120 is depicted as being a single element, first capacitor 120 could be embodied by multiple sub-elements, such as a plurality of first capacitors electrically coupled in parallel. First capacitor 120 is omitted in some alternate embodiments of serial communication link 102 such that serializer 116 is directly communicatively coupled to first end 112 of waveguide 110.

First PoC filter 124 is electrically coupled between first end 112 of waveguide 110 and one or more electrical loads of first node 136. The electrical loads of first node 136 are powered from electrical power transmitted from second node 138 to first node 136 via waveguide 110. FIG. 1 depicts serializer 116 and one or more sensors being electrically coupled to power circuitry 123, such that serializer 116 and one or more sensors 104 are electrical loads of first node 136 that are powered from second node 138 via waveguide 110 and first PoC filter 124. However, first node 136 could include additional electrical loads and/or alternative electrical loads without departing from the scope hereof. Power circuitry 123 is configured to transmit electrical power from first PoC filter 124 to the electrical loads (e.g., serializer 116 and one or more sensors 104) of first node 136. FIG. 1 depicts power circuitry 123 as being embodied by an electrical conductor 148 between first PoC filter 124 and the electrical loads of first node 136, where electrical conductor 148 includes, for example, one or more wires and/or printed circuit board (PCB) traces. However, power circuitry 123 may include alternative and/or additional elements, such as a power management device (e.g., a power regulator and/or a switch), a safety device (e.g., a fuse, a circuit breaker, and/or a overcurrent protection device), a filtering device, etc., without departing from the scope hereof. In certain embodiments, first decoupling capacitor 128 has a capacitance value of 0.1 microfarad, and second decoupling capacitor 130 has a capacitance value of 0.01 microfarad.

First PoC filter 124 is configured to allow transmission of DC electrical power from waveguide 110 to power circuitry 123 while blocking transmission of AC signals from power circuitry 123 to waveguide 110 and serializer 116. First PoC filter 124 includes a first inductor 150, a second inductor 152, and an optional resistor 154. First inductor 150 and second inductor 152 are electrically coupled in series between (a) first end 112 of waveguide 110 and (b) electrical loads of first node 136 via power circuitry 123, and first inductor 150 and second inductor 152 are electrically coupled together at a point 156. Optional resistor 154, if present, is electrically coupled in parallel with first inductor 150. Optional resistor 154 provides dampening and thereby prevents spikes in impedance presented by first PoC filter 124. First inductor 150 and second inductor 152 are configured to collectively present a sufficiently high impedance over an entire operating frequency range of serial communication link 102 to block transmission of undesired AC signals from power circuitry 123 to waveguide 110. For example, in certain embodiments, first inductor 150 and second inductor 152 are configured to collectively present an impedance of at least one thousand ohms over the entire operating frequency range of serial communication link 102, where the impedance is measured between points A and B in FIG. 1, i.e., across the series combination of first inductor 150 and second inductor 152 and including first decoupling capacitor 128 and second decoupling capacitor 130, when first PoC filter 124 is disconnected from other elements of first node 136. The entire operating frequency range of serial communication link 102 is an entire frequency range used by serial communication link 102 to transmit signals over waveguide 110. The entire operating frequency range of serial communication link 102 extends, for example, from at least 10 megahertz to 3 gigahertz, although serial communication link 102 need not use all portions of this frequency range.

Furthermore, in particular embodiments, first inductor 150 is configured to present an impedance of at least one thousand ohms over an entire operating frequency range of a back communication channel of serial communication link 102, and second inductor 152 is configured to present an impedance of at least one thousand ohms over an entire operating frequency range of a forward communication channel of serial communication link 102. The back communication channel of serial communication link 102 transmits signals from second node 138 to first node 136, while the forward channel of serial communication link 102 transmits signals from first node 136 to second node 138. In some embodiments, the forward communication channel operates at a higher frequency range than the back communication channel. For example, in certain embodiments, the back communication channel of serial communication link 102 encompasses a frequency range of at least 10 megahertz to 200 megahertz, and the forward communication channel of serial communication link 102 encompasses a frequency range of at least 300 megahertz to 3 gigahertz.

In certain embodiments, first inductor 150 has an inductance value that is substantially equal to 22 microhenries, and second inductor 152 has an inductance value that is substantially equal to 560 nanohenries. Applicant has found that these particular inductance values may be particularly suited for achieving sufficiently high impedance of first POC filter 124 over the entire operating frequency range of serial communication link 102, although it is understood that first inductor 150 and second inductor 152 are not limited to these inductance values. Additionally, optional resistor 154 has a resistance of substantially 5.1 kilohms, in certain embodiments. In this document, "substantially equal" means with plus or minus ten percent. For example, X is substantially equal to Y if the following expression holds true: $(0.90)Y \leq X \leq (1.10)Y$.

Waveguide 110 is configured to transmit signals and electrical power between first node 136 and second node 138. Waveguide 110 includes an electrical conductor 158 and an electrical shield 160. In some embodiments, electrical shield 160 is metallic and at least partially surrounds electrical conductor 158, such as to help prevent egress of signals carried by electrical conductor 158 and/or to help prevent ingress of undesired signals to electrical conductor 158. Electrical shield 160 optionally also serves as electrical conductor that electrically couples first node 136 and second node 138. Electrical shield 160 is optionally grounded or electrically coupled to another reference point, such as at both of first end 112 and second end 114, as illustrated in FIG. 1.

Figure 3:
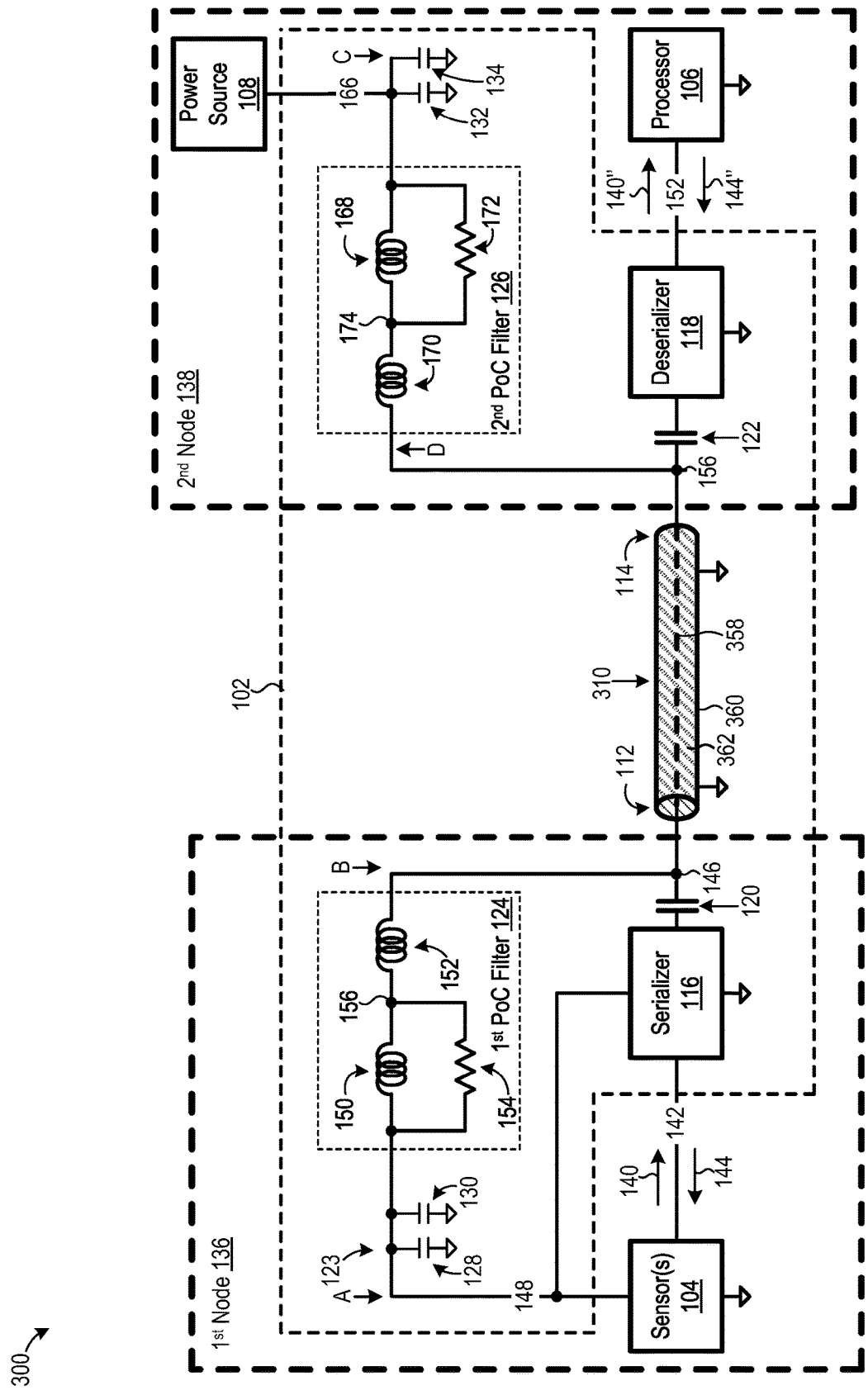
FIG. 3 is a schematic diagram of an embodiment of the FIG. 1 distributed system where a waveguide is embodied by a coaxial electrical cable.

In particular embodiments, waveguide 110 includes a coaxial electrical cable. For example, FIG. 3 is a schematic diagram of a distributed system 300, which is an embodiment of distributed 100 (FIG. 1) where waveguide 110 is embodied by a coaxial electrical cable 310. Coaxial electrical cable 310 includes a center electrical conductor 358 and a metallic electrical shield 360, which are embodiments of electrical conductor 158 and electrical shield 160, respectively. Coaxial electrical cable 310 further includes a dielectric material 362, such as plastic, foam, paper, and/or ceramic material, separating center electrical conductor 358 from metallic electrical shield 360. Certain embodiments of coaxial electrical cable 310 have an impedance of 50 ohms.

Referring again to FIG. 1, deserializer 118 is communicatively coupled to second end 114 of waveguide 110 at a point 162, via second capacitor 122. Second capacitor 122 enables transmission of AC signals between deserializer 118 and waveguide 110, but second capacitor 122 blocks transmission of DC signals between waveguide 110 and deserializer 118. While second capacitor 122 is depicted as being a single element, second capacitor 122 could be embodied by multiple sub-elements, such as two or more second capacitors 122 electrically coupled in parallel. Second capacitor 122 is omitted in some alternate embodiments of serial communication link 102 such that deserializer 118 is directly communicatively coupled to second end 114 of waveguide 110.

Deserializer 118 is configured to communicatively interface processor 106 with waveguide 110. For example, in certain embodiments, deserializer 118 is configured to convert sensor signals 140' received from waveguide 110 from serial form to parallel form, to generate sensor signals 140" for use by processor 106. In some embodiments, deserializer 118 is optionally also configured to convert control signals 144" from processor 106 from parallel form to serial form, to generate control signals 144' for transmission to first node 136 via waveguide 110. However, deserializer 118 could be configured to communicatively interface processor 106 with waveguide 110 in other manners without departing from the scope hereof.

A second communication bus 164 is configured to communicatively couple sensor signals 140" from deserializer 118 to processor 106, and second communication bus 164 is optionally further configured to communicatively couple control signals 144" from processor 106 to deserializer 118. Processor 106 is configured, for example, to perform one or more ADAS functions and/or to output data representing, or derived from, sensor signals 140". Processor 106 may be replaced with, or supplemented by, one or more other elements for receiving sensor signals 140" and/or generating control signals 144".

Second PoC filter 126 is electrically coupled between (a) second end 114 of waveguide 110 and (b) electrical power source 108 via a power bus 166. Optional third decoupling capacitor 132 and optional fourth decoupling capacitor 134 are also electrically coupled to power bus 166. In certain embodiments, third decoupling capacitor 132 has a capacitance value of 0.1 microfarad, and fourth decoupling capacitor 134 has a capacitance value of 0.01 microfarad. Second PoC filter 126 is configured to allow transmission of DC electrical power from electrical power source 108 to waveguide 110, such as for transmission of electrical power to first node 136, while blocking transmission of AC signals from electrical power source 108 to waveguide 110 and deserializer 118.

Second PoC filter 126 includes a third inductor 168, a fourth inductor 170, and an optional resistor 172. Third inductor 168 and fourth inductor 170 are electrically coupled in series between (a) electrical power source 108 via power bus 166 and (b) second end 114 of waveguide 110. Third inductor 168 and fourth inductor 170 are electrically coupled together at a point 174. Optional resistor 172, if present, is electrically coupled in parallel with third inductor 168. Optional resistor 172 provides dampening and thereby prevents spikes in impedance presented by second PoC filter 126. Third inductor 168 and fourth inductor 170 are configured to collectively present a sufficiently high impedance over an entire operating frequency range of serial communication link 102 to block transmission of undesired AC signals from electrical power source 108 to waveguide 110 and deserializer 118. For example, in certain embodiments, third inductor 168 and fourth inductor 170 are configured to collectively present an impedance of at least one thousand ohms over the entire operating frequency range of serial communication link 102, where the impedance is measured between points C and D of FIG. 1, i.e., across the series combination of third inductor 168 and fourth inductor 170 and including third decoupling capacitor 132 and fourth decoupling capacitor 134, when second PoC filter 126 is disconnected from other elements of second node 138. Furthermore, in particular embodiments third inductor 168 is configured to present an impedance of at least one thousand ohms over the entire operating frequency range of the back communication channel of serial communication link 102, and fourth inductor 170 is configured to present an impedance of at least one thousand ohms over an entire operating frequency range of a forward communication channel of serial communication link 102.

In certain embodiments, third inductor 168 has an inductance value that is substantially equal to 22 microhenries, and fourth inductor 170 has an inductance value that is substantially equal to 560 nanohenries. Applicant has found that these particular inductance values may be particularly suited for achieving sufficiently high impedance of second PoC filter 126 over the entire operating frequency range of serial communication link 102, although it is understood that third inductor 168 and fourth inductor 170 are not limited to these inductance values. It should be appreciated the first PoC filter 124 and second PoC filter 126 collectively include only four inductors, which promote low cost, small size, and a small bill of materials, for the two PoC filters.

Figure 4:
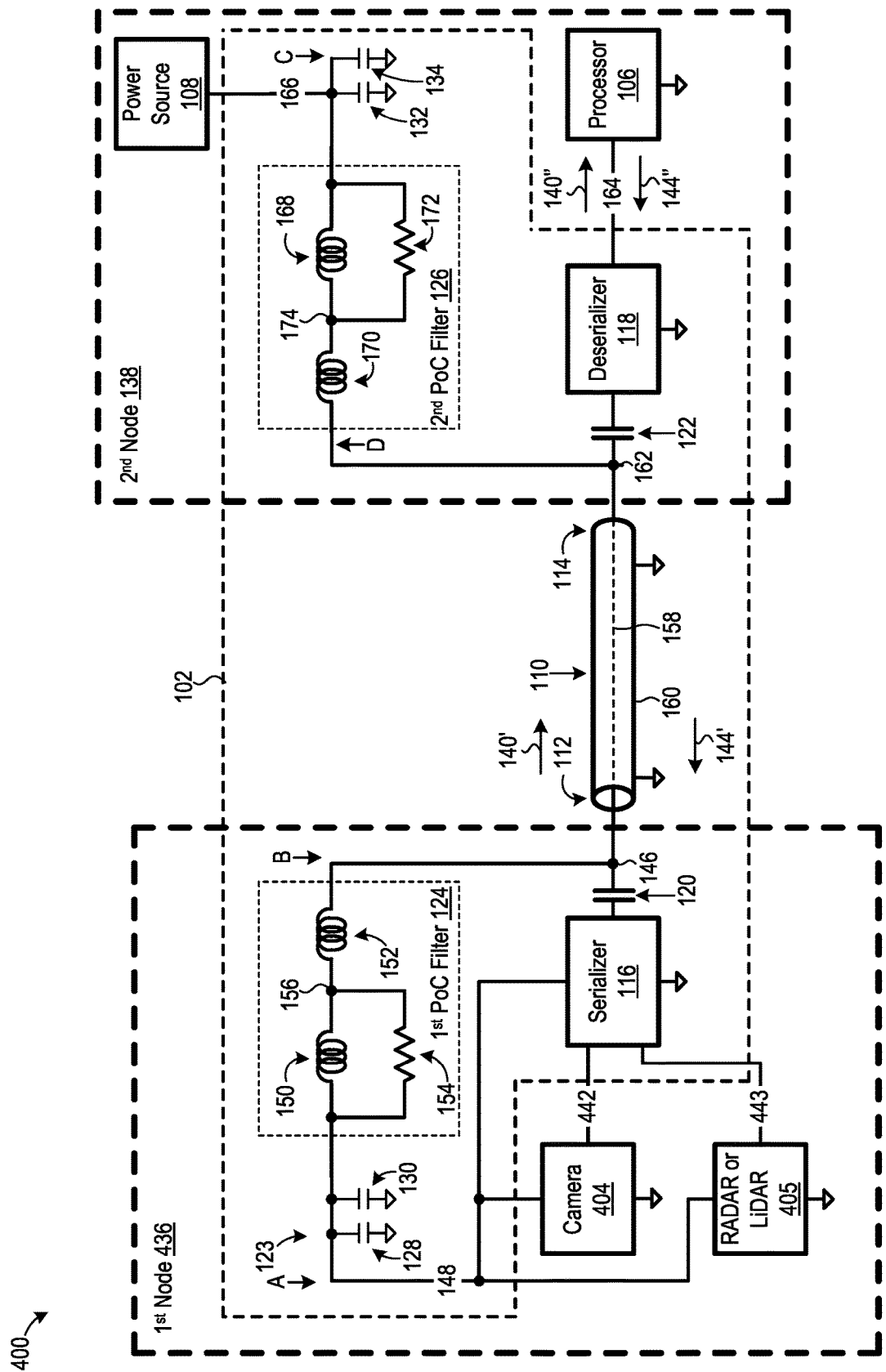
FIG. 4 is a schematic diagram of an embodiment of the FIG. 1 distributed system including a plurality of sensors.

FIG. 4 is a schematic diagram of a distributed system 400, which is an embodiment of distributed system 100 of FIG. 1 where first node 136 is embodied by a first node 436 including a plurality of sensors. In particular, one or more sensors 104 of first node 136 are embodied by (a) a camera 404 and (b) a RADAR or LiDAR device 405, in first node 436. Camera 404 is communicatively coupled to serializer 116 via a communication bus 442, and RADAR or LiDAR device 405 is communicatively coupled to serializer 116 via a communication bus 443. Serializer 116, camera 404, and RADAR or LiDAR device 405 collectively form electrical loads of first node 436, which receive electrical power from waveguide 110 via first PoC filter 124 and power circuitry 123. In some embodiments, distributed system 400 is, or is part of, an ADAS.

Figure 5:
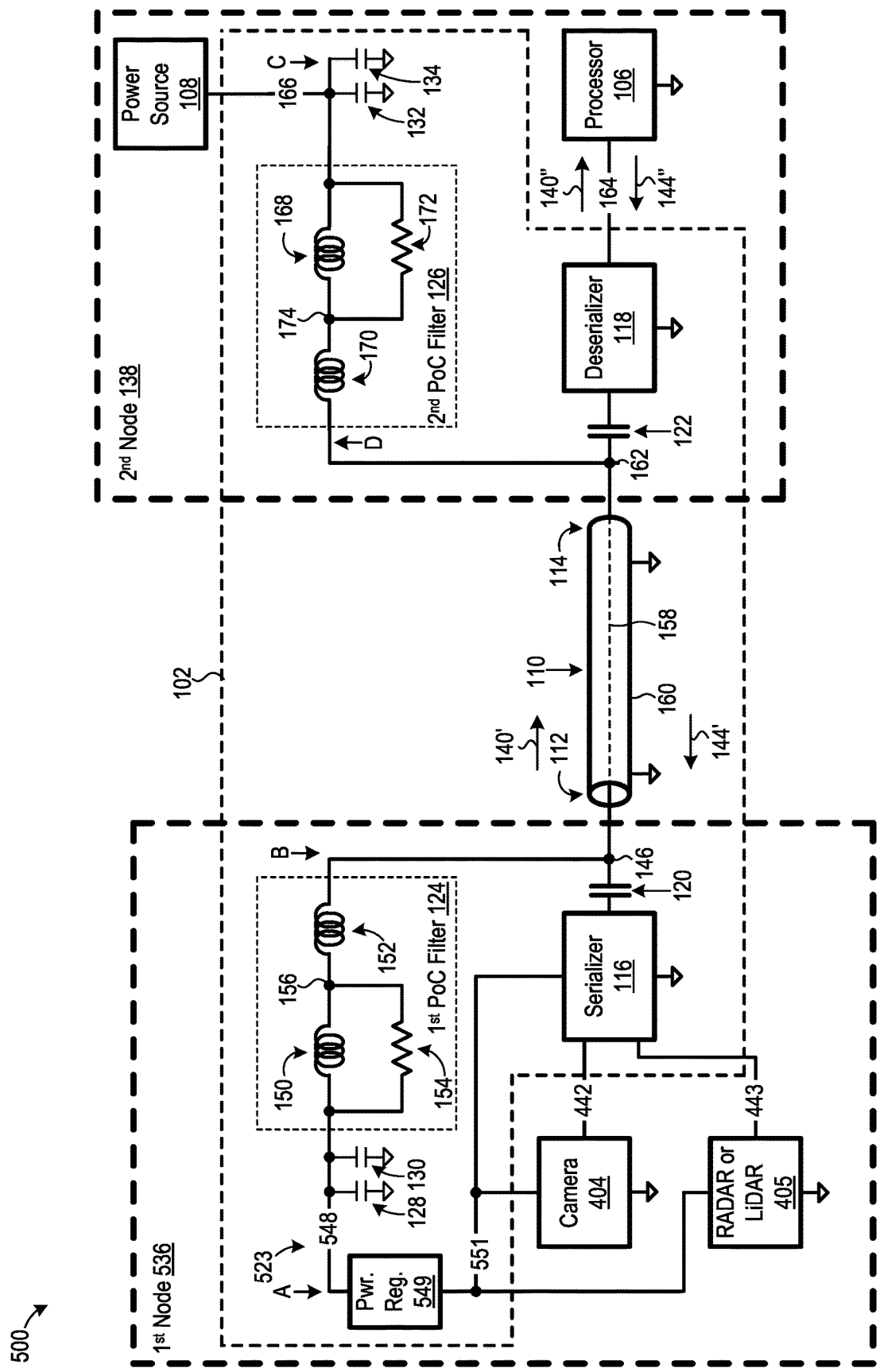
FIG. 5 is an alternate embodiment of the FIG. 4 distributed system where power circuitry includes a power regulator.

FIG. 5 is a schematic diagram of a distributed system 500, which is an alternate embodiment of distributed system 400 of FIG. 4 where first node 436 is replaced with a first node 536. First node 536 includes power circuitry 523, which is an alternate embodiment of power circuitry 123 of distributed systems 100 and 400. Power circuitry 523 includes an electrical conductor 548, a power regulator 549, and an electrical conductor 551. Electrical conductor 548 electrically couples power regulator 549 to first PoC filter 124, and electrical conductor 551 electrically couples power regulator 549 to electrical loads (camera 404 and RADA or LiDAR device 405) of first node 536. Power regulator 549 is configured, for example, to regulate magnitude of voltage at electrical conductor 551. In some embodiments, power regulator 549 is a linear regulator or a switching converter. Power regulator 549 could be replaced by, or supplemented with, other devices, such as a safety device (e.g., a fuse, a circuit breaker, or an overcurrent protection device) and/or a filter device.

Figure 6:
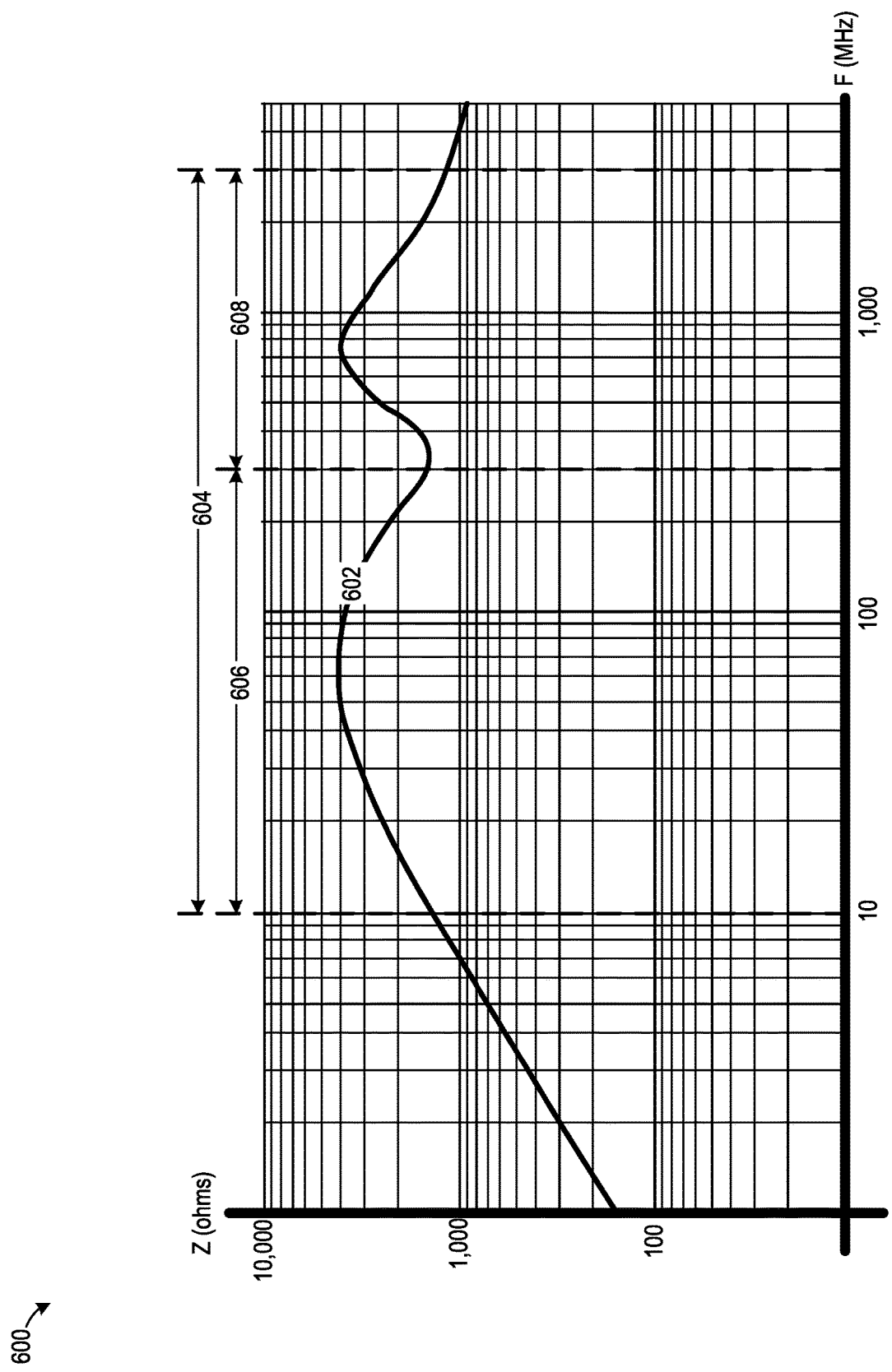
FIG. 6 is a graph of impedance versus frequency of one embodiment of a first PoC filter of the FIG. 1 distributed system.

FIG. 6 is a graph 600 of impedance versus frequency illustrating performance of an embodiment of first PoC filter 124 (FIG. 1) where (a) inductance of first inductor 150 is equal to 22 microhenries, (b) inductance of second inductor 152 is equal to 560 nanohenries, and (c) resistor 154 is present and has a resistance equal to 5.1 kilohms. Graph 600 is also representative of particular embodiments of second PoC filter 126 having an analogous configuration. Graph 600 includes a curve 602 representing impedance of said embodiment of first POC filter 124 versus frequency, i.e., collective impedance of the series connection of first inductor 150 and second inductor 152 as measured between points A and B of FIG. 1 when first PoC filter 124 is disconnected from other elements of first node 136. Frequency range 604 is an example entire operating frequency range of serial communication link 102 and includes a low frequency portion 606 and high frequency portion 608. Low frequency portion 606 is, for example, used for the back communication channel of serial communication link 102, and high frequency portion 608 is, for example, used for the forward communication channel of serial communication link 102. It is understood, though, that serial communication link 102 is not limited to operating in the example frequency ranges of FIG. 6. It should be noted that the embodiment of first POC filter 124 corresponding to FIG. 6 has an impedance, as measured between points A and B of FIG. 1, of over 1 kilohm over entire operating frequency range 604.

Referring again to FIG. 1, certain embodiments of first PoC filter 124 and second PoC filter 126 are formed on respective PCBs. While not required, first PoC filter 124 and second PoC filter 126 may be configured to comply with the following PCB component placement and layout guidelines to help achieve maximum performance: (a) omit a ground plane under first inductor 150 and second inductor 152, (b) place optional first decoupling capacitor 128 and optional second decoupling capacitor 130 close to first inductor 150, (c) omit a ground plane under third inductor 168 and fourth inductor 170, and (d) place optional third decoupling capacitor 132 and optional fourth decoupling capacitor 134 close to third inductor 168.

Figure 7:
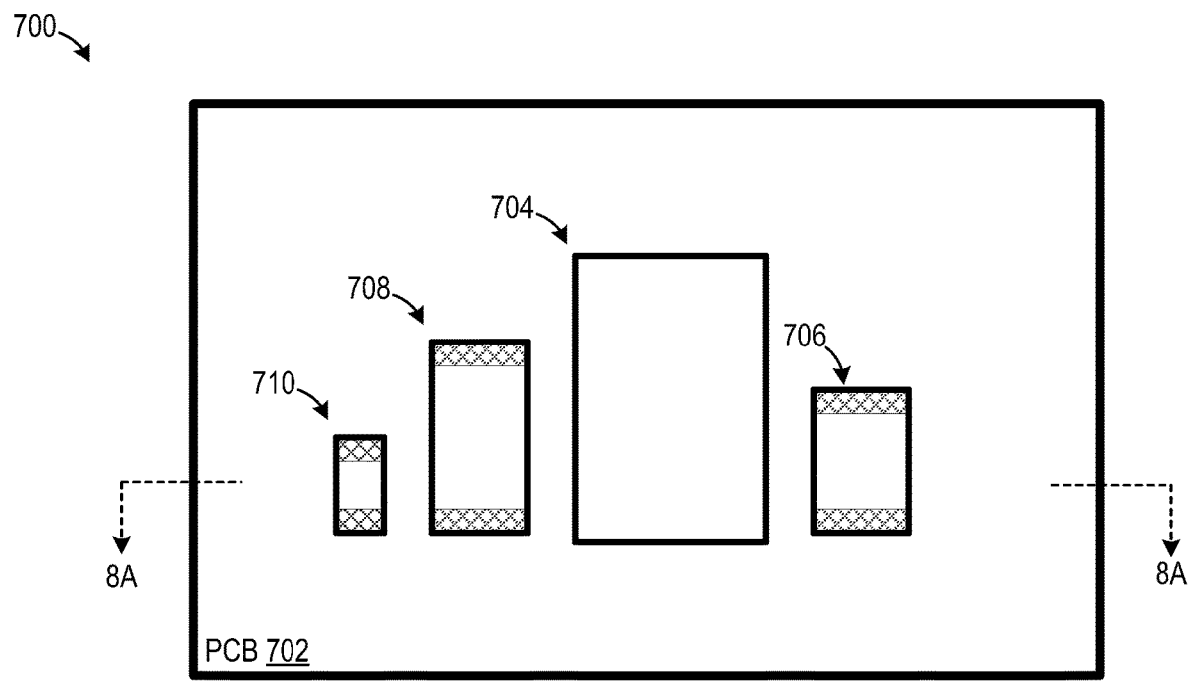
FIG. 7 is a top plan view of an embodiment of the first POC filter of the FIG. 1 distributed system where the first PoC filter is formed on a printed circuit board (PCB).
Figure 8:
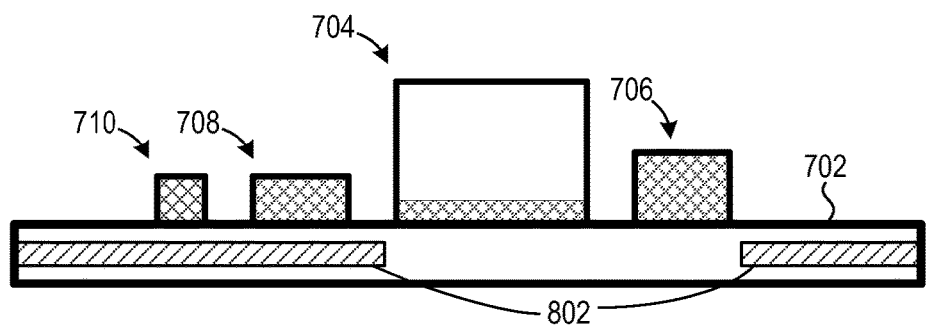
FIG. 8 is a cross-sectional view of the FIG. 7 POC filter taken along line 8A-8A of FIG. 7.

For example, FIG. 7 is a top plan view of a POC filter 700 formed on a PCB 702, where PoC filter 700 is one embodiment of first PoC filter 124 of FIG. 1. PoC filter 700 includes a first inductor 704, a second inductor 706, a first decoupling capacitor 708, and a second decoupling capacitor 710, which are embodiments of first inductor 150, second inductor 152, first decoupling capacitor 128, and second decoupling capacitor 130, respectively. First decoupling capacitor 708 and second decoupling capacitor 710 are placed close to first inductor 704 in PoC filter 700. FIG. 8 is a cross-sectional view of PoC filter 700 taken along line 8A-8A of FIG. 7. A ground plane 802 in PCB 702 does not extend under first inductor 704 and second inductor 706, in accordance with aforesaid layout guidelines. While not required, it is anticipated that PCB 702 will typically include one or more power planes, as well as one or more signal layers, which are not show in FIG. 8 for illustrative clarity.

Figure 9:
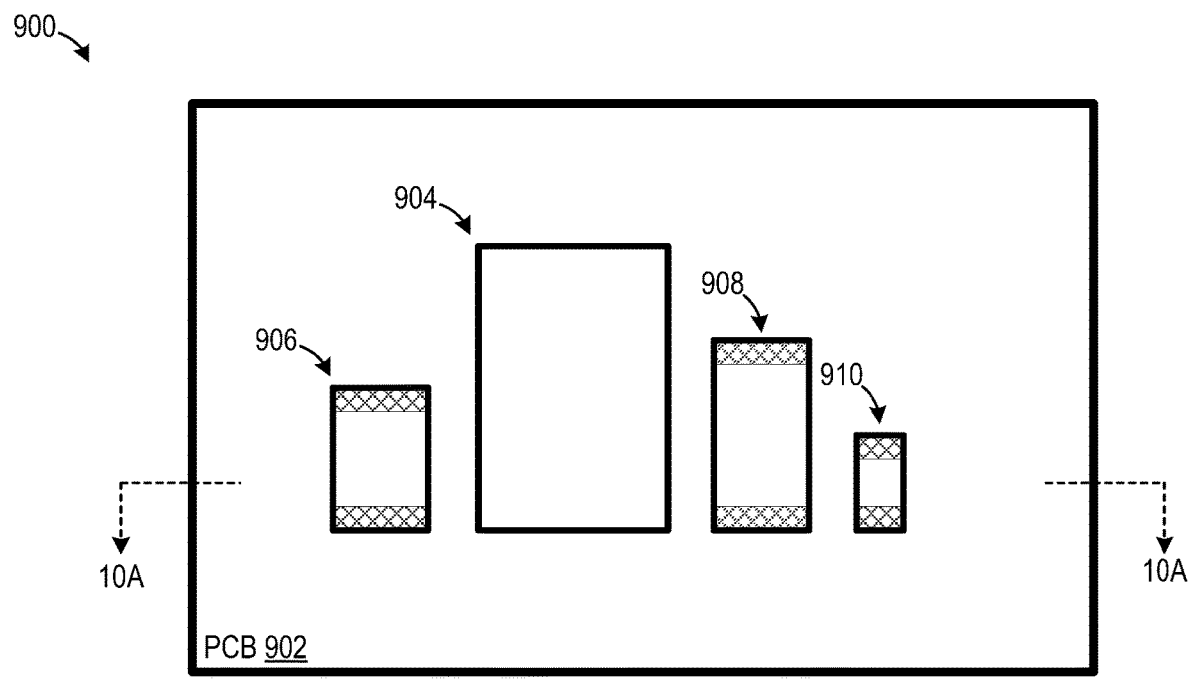
FIG. 9 is a top plan view of an embodiment of a second PoC filter of the FIG. 1 distributed system where the second PoC filter is formed on a PCB.
Figure 10:
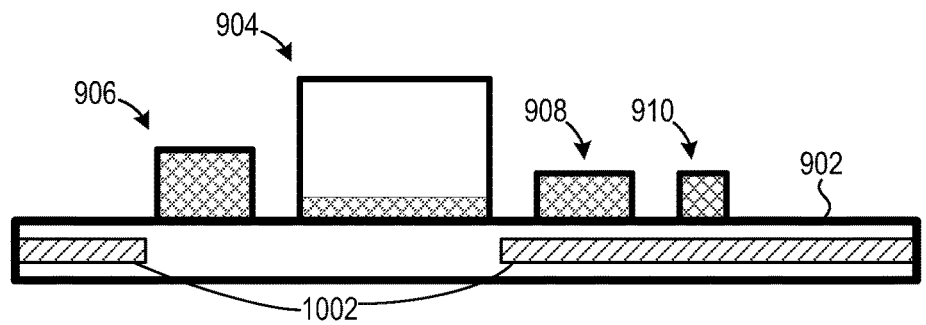
FIG. 10 is a cross-sectional view of the FIG. 9 POC filter taken along line 10A-10A of FIG. 9.

As another example, FIG. 9 is a top plan view of a PoC filter 900 formed on a PCB 902, where PoC filter 900 is one embodiment of second PoC filter 126 of FIG. 1. POC filter 900 includes a third inductor 904, a fourth inductor 906, a third decoupling capacitor 908, and a fourth decoupling capacitor 910, which are embodiments of third inductor 168, fourth inductor 170, third decoupling capacitor 132, and fourth decoupling capacitor 134, respectively. Third decoupling capacitor 908 and fourth decoupling capacitor 910 are placed close to third inductor 904 in PoC filter 900. FIG. 10 is a cross-sectional view of POC filter 900 taken along line 10A-10A of FIG. 9. A ground plane 1002 in PCB 902 does not extend under third inductor 904 and fourth inductor 906, in accordance with aforesaid layout guidelines. While not required, it is anticipated that PCB 902 will typically include one or more power planes, as well as one or more signal layers, which are not show in FIG. 10 for illustrative clarity.

Figure 11:
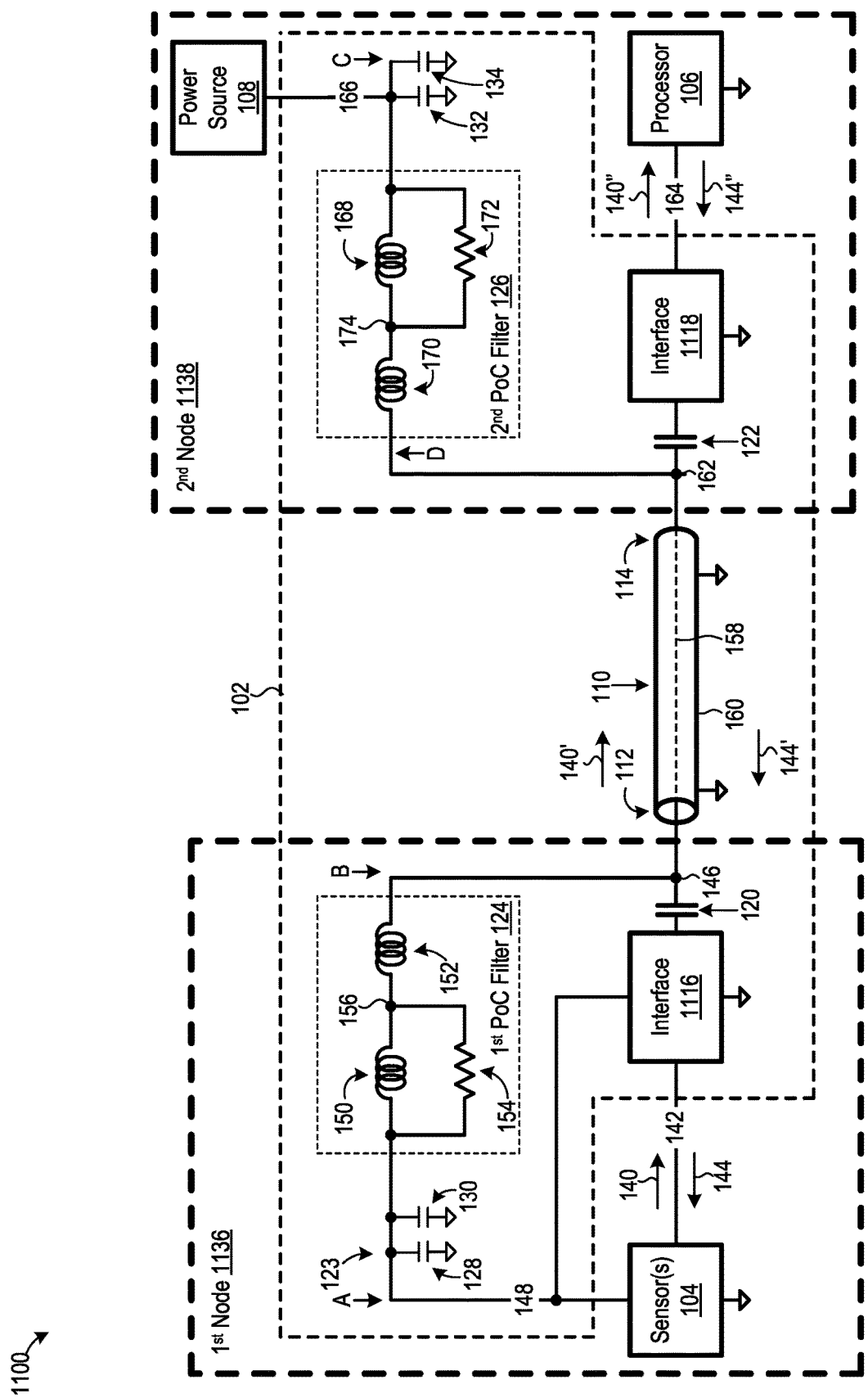
FIG. 11 is a schematic diagram of an alternate embodiment of the FIG. 1 distributed system that supports parallel communication.

The new POC filters discussed above are not limited to use with serial communication links. For example, FIG. 11 is a schematic diagram of a distributed system 1100, which is an alternate embodiment of distributed system 100 of FIG. 1 where first node 136 is replaced with a first node 1136 and second node 138 is replaced with a second node 1138. First node 1136 differs from first node 136 in that serializer 116 is replaced with a first communication interface device 1116, and second node 1138 differs from second node 138 in that deserializer 118 is replaced with a second communication interface device 1118. First communication interface device 1116 and second communication interface device 1118 are analogous to serializer 116 and deserializer 118, respectively, except that communication interface devices 1116 and 1118 are configured to transmit and/or receive signals via waveguide 110 using parallel communication. For example, certain embodiments of first communication interface device 1116 and second communication interface device 1118 are configured to implement a modulation/demodulation scheme that provides for a plurality of parallel communication subchannels across waveguide 110, thereby supporting parallel communication across waveguide 110.

Combinations of Features

Features described above may be combined in various ways without departing from the scope hereof. The following examples illustrate some possible combinations.

(A1) A serial communication link includes (1) a waveguide having a first end and a second end, (2) a serializer communicatively coupled to the first end of the waveguide, (3) a deserializer communicatively coupled to the second end of the waveguide, (4) a first power over cable (PoC) filter electrically coupled to the first end of the waveguide, and (5) a second PoC filter electrically coupled to the second end of the waveguide. The first PoC filter includes two inductors that are configured to collectively present an impedance of at least one thousand ohms over an entire operating frequency range of the serial communication link, and the second POC filter includes two inductors that are configured to collectively present an impedance of at least one thousand ohms over the entire operating frequency range of the serial communication link.

(A2) In the serial communication link denoted as (A1), the first PoC filter may be electrically coupled between the first end of the waveguide and one or more electrical loads.

(A3) In either one of the serial communication links denoted as (A1) or (A2), the second PoC filter may be electrically coupled between the second end of the waveguide and an electrical power source.

(A4) In any one of the serial communication links denoted as (A1) through (A3), the two inductors of the first PoC filter may consist of (1) a first inductor configured to present an impedance of at least one thousand ohms over an entire operating frequency range of a back communication channel of the serial communication link and (2) a second inductor configured to present an impedance of at least one thousand ohms over an entire operating frequency range of a forward communication channel of the serial communication link.

(A5) In the serial communication link denoted as (A4), (1) the first inductor may have an inductance value that is substantially equal to 22 microhenries, and (2) the second inductor may have an inductance value that is substantially equal to 560 nanohenries.

(A6) In either one of the serial communication links denoted as (A4) or (A5), the two inductors of the second PoC filter may consist of (1) a third inductor configured to present an impedance of at least one thousand ohms over the entire operating frequency range of the back communication channel of the serial communication link and (2) a fourth inductor configured to present an impedance of at least one thousand ohms over the entire operating frequency range of the forward communication channel of the serial communication link.

(A7) In the serial communication link denoted as (A6), (1) the third inductor may have an inductance value that is substantially equal to 22 microhenries, and (2) the fourth inductor may have an inductance value that is substantially equal to 560 nanohenries.

(A8) In any one of the serial communication links denoted as (A1) through (A7), the first PoC filter may further include a resistor electrically coupled in parallel with the first inductor.

(A9) In any one of the serial communication links denoted as (A1) through (A8), the entire operating frequency range of the serial communication link may encompass a frequency range extending at least from 10 megahertz to 3 gigahertz.

(A10) In any one of the serial communication links denoted as (A1) through (A9), the waveguide may include a coaxial electrical cable.

(A11) In any one of the serial communication links denoted as (A1) through (A10), (1) the serializer may be communicatively coupled to the first end of the waveguide via one or more first capacitors, and (2) the deserializer may be communicatively coupled to the second end of the waveguide via one or more second capacitors.

(B1) An advanced driver assistance system (ADAS) includes (1) any one of the serial communication links denoted as (A1) through (A11), henceforth denoted as "the first serial communication link," and (2) one or more sensors communicatively coupled to the serializer of the first serial communication link.

(B2) In the ADAS denoted as (B1), the one or more sensors may include one or more of a camera, a RADAR device, and a LiDAR device.

(C1) A node for a distributed system includes (1) one or more sensors configured to generate sensor signals, (2) a serializer configured to communicatively interface the one or more sensors with an end of a waveguide of a serial communication link of the distributed system, (3) power circuitry configured to provide electrical power to the one or more sensors and the serializer, and (4) a power over cable (PoC) filter configured to be electrically coupled between the power circuitry and the end of the waveguide of the serial communication link of the distributed system. The PoC filter includes a first inductor and a second inductor that are configured to collectively present an impedance of at least one thousand ohms over an entire operating frequency range of the serial communication link of the distributed system.

(C2) In the node denoted as (C1), (1) the first inductor may be configured to present an impedance of at least one thousand ohms over an entire operating frequency range of a back communication channel of the serial communication link of the distributed system, and (2) the second inductor may be configured to present an impedance of at least one thousand ohms over an entire operating frequency range of a forward communication channel of the serial communication link of the distributed system.

(C3) In either of the nodes denoted as (C1) and (C2), (1) the first inductor may have an inductance value that is substantially equal to 22 microhenries, and (2) the second inductor has an inductance value that is substantially equal to 560 nanohenries.

(C4) In any one of the nodes denoted as (C1) through (C3), the PoC filter may further include a resistor electrically coupled in parallel with the first inductor.

(C5) In any one of the nodes denoted as (C1) through (C4), the one or more sensors may include one or more of a camera, a RADAR device, and a LiDAR device.

(C6) In any one of the nodes denoted as (C1) through (C5), the entire operating frequency range of the serial communication link of the distributed system may encompass a frequency range extending at least from 10 megahertz to 3 gigahertz.

(D1) A power over cable (PoC) filter for a serial communication link includes a first inductor and a second inductor that are configured to be electrically coupled in series between (a) a first end of a waveguide of the serial communication link and (b) one or more electrical loads, where the first inductor and the second inductor are configured to collectively present an impedance of at least one thousand ohms over an entire operating frequency range of the serial communication link.

(D2) In the PoC filter denoted as (D1), the entire operating frequency range of the serial communication link may encompass a frequency range extending at least from 10 megahertz to 3 gigahertz.

(D3) In either one of the PoC filters denoted as (D1) and (D2), (1) the first inductor may have an inductance value that is substantially equal to 22 microhenries, and (2) the second inductor may have an inductance value that is substantially equal to 560 nanohenries.

(D4) Any one of the PoC filters denoted as (D1) through (D3) may further include a resistor electrically coupled in parallel with the first inductor.

(E1) A communication link includes (1) a waveguide having a first end and a second end, (2) a first communication interface device communicatively coupled to the first end of the waveguide, (3) a second communication interface device communicatively coupled to the second end of the waveguide, (4) a first power over cable (PoC) filter electrically coupled to the first end of the waveguide, and (5) a second PoC filter electrically coupled to the second end of the waveguide. The first PoC filter includes two inductors that are configured to collectively present an impedance of at least one thousand ohms over an entire operating frequency range of the communication link, and the second PoC filter includes two inductors that are configured to collectively present an impedance of at least one thousand ohms over the entire operating frequency range of the communication link.

(F1) A node for a distributed system includes (1) one or more sensors configured to generate sensor signals, (2) a first communication interface configured to communicatively interface the one or more sensors with an end of a waveguide of a communication link of the distributed system, (3) power circuitry configured to provide electrical power to the one or more sensors and the first communication interface, and (4) a power over cable (PoC) filter configured to be electrically coupled between the power circuitry and the end of the waveguide of the communication link of the distributed system. The PoC filter includes a first inductor and a second inductor that are configured to collectively present an impedance of at least one thousand ohms over an entire operating frequency range of the communication link of the distributed system.

(G1) A power over cable (PoC) filter for a communication link includes a first inductor and a second inductor that are configured to be electrically coupled in series between (a) a first end of a waveguide of the communication link and (b) one or more electrical loads. The first inductor and the second inductor are configured to collectively present an impedance of at least one thousand ohms over an entire operating frequency range of the communication link.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A serial communication link, comprising:
a waveguide having a first end and a second end;
a serializer communicatively coupled to the first end of the waveguide;
a deserializer communicatively coupled to the second end of the waveguide;
a first power over cable (PoC) filter electrically coupled to the first end of the waveguide, the first PoC filter including two inductors that are configured to collectively present an impedance of at least one thousand ohms over an entire operating frequency range of the serial communication link; and
a second PoC filter electrically coupled to the second end of the waveguide, the second PoC filter including two inductors that are configured to collectively present an impedance of at least one thousand ohms over the entire operating frequency range of the serial communication link.

2. The serial communication link of claim 1, wherein the first POC filter is electrically coupled between the first end of the waveguide and one or more electrical loads.

3. The serial communication link of claim 2, wherein the second PoC filter is electrically coupled between the second end of the waveguide and an electrical power source.

4. The serial communication link of claim 1, wherein the two inductors of the first PoC filter consist of:
a first inductor configured to present an impedance of at least one thousand ohms over an entire operating frequency range of a back communication channel of the serial communication link; and
a second inductor configured to present an impedance of at least one thousand ohms over an entire operating frequency range of a forward communication channel of the serial communication link.

5. The serial communication link of claim 4, wherein:
the first inductor has an inductance value that is substantially equal to 22 microhenries; and
the second inductor has an inductance value that is substantially equal to 560 nanohenries.

6. The serial communication link of claim 4, wherein the two inductors of the second PoC filter consist of:
a third inductor configured to present an impedance of at least one thousand ohms over the entire operating frequency range of the back communication channel of the serial communication link; and
a fourth inductor configured to present an impedance of at least one thousand ohms over the entire operating frequency range of the forward communication channel of the serial communication link.

7. The serial communication link of claim 6, wherein:
the third inductor has an inductance value that is substantially equal to 22 microhenries; and
the fourth inductor has an inductance value that is substantially equal to 560 nanohenries.

8. The serial communication link of claim 4, wherein the first POC filter further includes a resistor electrically coupled in parallel with the first inductor.

9. The serial communication link of claim 1, wherein the entire operating frequency range of the serial communication link encompasses a frequency range extending at least from 10 megahertz to 3 gigahertz.

10. The serial communication link of claim 1, wherein the waveguide comprises a coaxial electrical cable.

11. The serial communication link of claim 1, wherein:
the serializer is communicatively coupled to the first end of the waveguide via one or more first capacitors; and
the deserializer is communicatively coupled to the second end of the waveguide via one or more second capacitors.

12. An advanced driver assistance system (ADAS), comprising:
the serial communication link of claim 1; and
one or more sensors communicatively coupled to the serializer of the serial communication link of claim 1.

13. The ADAS of claim 12, wherein the one or more sensors include one or more of a camera, a RADAR device, and a LiDAR device.

14. A node for a distributed system, comprising:
one or more sensors configured to generate sensor signals;
a serializer configured to communicatively interface the one or more sensors with an end of a waveguide of a serial communication link of the distributed system;
power circuitry configured to provide electrical power to the one or more sensors and the serializer; and
a power over cable (PoC) filter configured to be electrically coupled between the power circuitry and the end of the waveguide of the serial communication link of the distributed system, the PoC filter including a first inductor and a second inductor that are configured to collectively present an impedance of at least one thousand ohms over an entire operating frequency range of the serial communication link of the distributed system.

15. The node of claim 14, wherein:
the first inductor is configured to present an impedance of at least one thousand ohms over an entire operating frequency range of a back communication channel of the serial communication link of the distributed system; and
the second inductor is configured to present an impedance of at least one thousand ohms over an entire operating frequency range of a forward communication channel of the serial communication link of the distributed system.

16. The node of claim 14, wherein:
the first inductor has an inductance value that is substantially equal to 22 microhenries; and
the second inductor has an inductance value that is substantially equal to 560 nanohenries.

17. A power over cable (PoC) filter for a serial communication link, comprising a first inductor and a second inductor that are configured to be electrically coupled in series between (a) a first end of a waveguide of the serial communication link and (b) one or more electrical loads, the first inductor and the second inductor being configured to collectively present an impedance of at least one thousand ohms over an entire operating frequency range of the serial communication link.

18. The PoC filter of claim 17, wherein the entire operating frequency range of the serial communication link encompasses a frequency range extending at least from 10 megahertz to 3 gigahertz.

19. The PoC filter of claim 17, wherein:
the first inductor has an inductance value that is substantially equal to 22 microhenries; and
the second inductor has an inductance value that is substantially equal to 560 nanohenries.

20. The PoC filter of claim 17, further comprising a resistor electrically coupled in parallel with the first inductor.

* * * * *